(12) United States Patent  
Katayama et al.

(10) Patent No.: US 9,677,482 B2  
(45) Date of Patent: Jun. 13, 2017

(54) SUPERCHARGING SYSTEM AND DIAGNOSTIC METHOD FOR SUPERCHARGING SYSTEM

(71) Applicant: Toyota Jidosha Kabushiki Kaisha, Toyota-shi, Aichi-ken (JP)

(72) Inventors: Akihiro Katayama, Toyota (JP); Takuya Matsumoto, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 84 days.

(21) Appl. No.: 14/797,629

(22) Filed: Jul. 13, 2015

(65) Prior Publication Data

US 2016/0010573 A1    Jan. 14, 2016

(30) Foreign Application Priority Data

Jul. 11, 2014 (JP) .................................. 2014-143471

(51) Int. Cl.

| | |
|---|---|
| *F02D 41/00* | (2006.01) |
| *F02D 41/22* | (2006.01) |
| *F02B 37/16* | (2006.01) |
| *F02B 37/18* | (2006.01) |
| *F02D 41/10* | (2006.01) |

(Continued)

(52) U.S. Cl.

CPC .......... *F02D 41/0007* (2013.01); *F02B 37/16* (2013.01); *F02D 41/221* (2013.01); *F02B 37/18* (2013.01); *F02B 39/04* (2013.01); *F02D 41/10* (2013.01); *F02D 41/18* (2013.01); *Y02T 10/144* (2013.01); *Y02T 10/40* (2013.01)

(58) Field of Classification Search

CPC ...... F02D 23/00; F02D 41/18; F02D 41/0007; F02B 37/18  
USPC ................................................. 60/605.1, 608  
See application file for complete search history.

(56) References Cited

U.S. PATENT DOCUMENTS

| | | | |
|---|---|---|---|
| 2008/0022679 A1* | 1/2008 | Hara ....................... | F02B 37/18 60/602 |
| 2008/0022968 A1* | 1/2008 | Miyauchi ................ | F02B 37/16 123/339.15 |

(Continued)

FOREIGN PATENT DOCUMENTS

| | | | | |
|---|---|---|---|---|
| JP | 09004507 A | 1/1997 | | |
| JP | WO 0229229 A1 * | 4/2002 | .............. | F02B 37/22 |

(Continued)

*Primary Examiner* — Patrick Maines  
(74) *Attorney, Agent, or Firm* — Dinsmore & Shohl LLP

(57) ABSTRACT

A supercharging system includes an internal combustion engine, a supercharger, and an electronic control unit configured to compute an integrated value of the intake air amount during a predetermined period on the basis of a detected result of a first sensor. The predetermined period is a period from a start of an increase in the supercharging pressure to an end of the increase at the time when the intake air amount is increased in a state where no command to reduce the supercharging pressure by a supercharging pressure reduction mechanism is issued. The electronic control unit is configured to acquire a peak supercharging pressure from a detected result of a second sensor. The electronic control unit is configured to determine whether the supercharging system has an abnormality on the basis of the integrated value of the intake air amount and the peak supercharging pressure.

18 Claims, 6 Drawing Sheets

(51) Int. Cl.
  *F02D 41/18* (2006.01)
  *F02B 39/04* (2006.01)

(56) References Cited

U.S. PATENT DOCUMENTS

| | | | |
|---|---|---|---|
| 2008/0058994 A1* | 3/2008 | Tsuda | F02D 41/18 700/282 |
| 2010/0153067 A1* | 6/2010 | Heinkele | F02D 41/18 702/182 |
| 2011/0154892 A1* | 6/2011 | Ibuki | F02B 37/013 73/114.79 |
| 2016/0010572 A1 | 1/2016 | Tsutsuji | |

FOREIGN PATENT DOCUMENTS

| | | |
|---|---|---|
| JP | 2008-025426 A | 2/2008 |
| JP | 2014-020252 A | 2/2014 |
| JP | 2016-020633 A | 2/2016 |

* cited by examiner

10 : INTERNAL COMBUSTION ENGINE
11 : INTAKE PASSAGE
12 : EXHAUST PASSAGE
14 : AIR FLOW METER
16 : SUPERCHARGING PRESSURE SENSOR
30 : COMPRESSOR
31 : TURBINE
34 : BYPASS PASSAGE
35 : WASTE GATE VALVE
39 : ELECTRONIC CONTROL UNIT

SUPERCHARGING SYSTEM AND DIAGNOSTIC METHOD FOR SUPERCHARGING SYSTEM

INCORPORATION BY REFERENCE

The disclosure of Japanese Patent Application No. 2014-143471 filed on Jul. 11, 2014 including the specification, drawings and abstract is incorporated herein by reference in its entirety.

BACKGROUND OF THE INVENTION

1. Field of the Invention

The invention relates to a supercharging system and a diagnostic method for a supercharging system.

2. Description of Related Art

As a supercharging system that is applied to an internal combustion engine, there is a supercharging system that supercharges an internal combustion engine by utilizing exhaust energy, that is, a so-called turbocharger. A supercharging system of this type includes a compressor and a turbine that drives the compressor. The compressor is installed in an intake passage of the internal combustion engine. The compressor pressurizes intake air flowing through the intake passage, and discharges the pressurized intake air to a combustion chamber of the internal combustion engine. The turbine is installed in an exhaust passage of the internal combustion engine. The turbine is operated by the stream of exhaust gas flowing through the exhaust passage, and drives the compressor. In addition, a supercharging system of this type may include a bypass passage and a waste gate valve for actively controlling the supercharging operation of the supercharging system. The bypass passage is a passage that bypasses the turbine and allows exhaust gas to flow. The waste gate valve interrupts flow of exhaust gas through the bypass passage when fully closed, and allows flow of exhaust gas through the bypass passage when opened.

Japanese Patent Application Publication No. 09-004507 (JP 09-004507 A) describes a technique for diagnosing whether a waste gate valve has an abnormality, such as locking. In JP 09-004507 A, a supercharging pressure during supercharging and a supercharging pressure during non-supercharging are compared with each other, and, when the difference between those supercharging pressures is smaller than a value that is estimated during normal times, it is determined that the waste gate valve is locked. In this way, whether the waste gate valve is locked is diagnosed.

SUMMARY OF THE INVENTION

There is a supercharger as a supercharging system. The supercharger is operated by the power of an internal combustion engine, and supercharges the internal combustion engine. Among such supercharging systems of this type, there is a supercharging system that includes a relief valve and that reduces a supercharging pressure by opening the relief valve and releasing part of intake air at the time when the supercharging pressure is excessively high. The relief valve is provided at a portion downstream of the supercharger in an intake passage.

Incidentally, there is one of abnormalities of a waste gate valve, that is, an abnormality called small-opening locking. The small-opening locking is such an abnormality that the valve is locked at a position slightly close to a valve open side from a fully closed position and becomes not completely closed. Even during the small-opening locking, the supercharging pressure increases to some extent, so there is a concern that such an abnormality cannot be detected with sufficient accuracy through the above-described diagnosis based on the supercharging pressure.

The relief valve of the supercharger can also be locked at a small opening degree. When the relief valve is locked at a small opening degree as well, the supercharging pressure increases to some extent. Therefore, ensuring diagnostic accuracy is difficult through the above-described diagnosis based on the supercharging pressure.

The invention provides a supercharging system and a diagnostic method for a supercharging system, which are able to suitably diagnose such an abnormality that exhibits a relatively small change in a supercharging pressure.

A first aspect of the invention provides a supercharging system. The supercharging system includes an internal combustion engine, a supercharger, a supercharging pressure reduction mechanism, a first sensor, a second sensor, and an electronic control unit. The supercharger is configured to supercharge the internal combustion engine. The supercharging pressure reduction mechanism is configured to reduce a supercharging pressure. The first sensor is configured to detect an intake air amount of the internal combustion engine. The second sensor is configured to detect the supercharging pressure. The electronic control unit is configured to compute an integrated value of the intake air amount during a predetermined period on the basis of a detected result of the first sensor. The predetermined period is a period from a start of an increase in the supercharging pressure to an end of the increase at the time when the intake air amount is increased in a state where no command to reduce the supercharging pressure by the supercharging pressure reduction mechanism is issued. The electronic control unit is configured to acquire a peak supercharging pressure from a detected result of the second sensor. The peak supercharging pressure is an amount of increase in the supercharging pressure during the predetermined period. The electronic control unit is configured to determine whether the supercharging system has an abnormality on the basis of the integrated value of the intake air amount and the peak supercharging pressure.

There is a correlation between the integrated value of the intake air amount during the period from the start of an increase in the supercharging pressure to the end of the increase at the time when the supercharging pressure is increased with an increase in the intake air amount and the amount of increase in the supercharging pressure during the period from the start of an increase in the supercharging pressure to the end of the increase at the time when the supercharging pressure is increased with an increase in the intake air amount. That is, there is a correlation between the integrated value of the intake air amount and the peak supercharging pressure. When the supercharging pressure is reduced because of an abnormality in the situation in which the supercharging pressure should not be reduced by the supercharging pressure reduction mechanism, the correlation between the integrated value of the intake air amount and the peak supercharging pressure changes. Even when the amount of reduction in the supercharging pressure due to the abnormality at this time is small, there appears a relatively large change in the correlation between the integrated value of the intake air amount and the peak supercharging pressure. Thus, when it is determined whether there is an abnormality on the basis of the integrated value of the intake air amount and the peak supercharging pressure, it is possible to suitably diagnose such an abnormality that a change that appears in the supercharging pressure is relatively small.

In the above aspect, the electronic control unit may be configured to set a determination value. The determination value at the time when the peak supercharging pressure is high is larger than the determination value at the time when the peak supercharging pressure is low. The electronic control unit may be configured to, when the integrated value of the intake air amount is larger than the determination value, determine that the supercharging system has an abnormality.

In the above aspect, the electronic control unit may be configured to set a determination value. The determination value at the time when the integrated value of the intake air amount is large is larger than the determination value at the time when the integrated value is small. The electronic control unit may be configured to, when the peak supercharging pressure is lower than the determination value, determine that the supercharging system has an abnormality.

The peak supercharging pressure exhibits a higher correlation with the integrated value of the amount of increase in the intake air amount from the start of an increase in the supercharging pressure than the integrated value of the intake air amount. That is, the peak supercharging pressure exhibits a higher correlation with the integrated value of the value obtained by subtracting the intake air amount detected at the start of an increase in the supercharging pressure from the currently detected intake air amount.

Therefore, in the above aspect, the electronic control unit may be configured to compute the integrated value of the intake air amount as a value through integration of a value, obtained by subtracting a second intake air amount from a first intake air amount, during the predetermined period. The first intake air amount is the intake air amount detected at the start of an increase in the supercharging pressure. The second intake air amount is the intake air amount detected currently.

In the above aspect, the supercharger may be a turbocharger that supercharges the internal combustion engine by driving a compressor with the use of a turbine. The turbine is installed in an exhaust passage of the internal combustion engine and is operated by stream of exhaust gas flowing through the exhaust passage. The compressor is installed in an intake passage of the internal combustion engine. The supercharging pressure reduction mechanism may be a waste gate valve installed in a bypass passage. The bypass passage is a passage that bypasses the turbine and allows the exhaust gas to flow. The waste gate valve may be configured to interrupt passage of the exhaust gas flowing through the bypass passage when the waste gate valve is fully closed. The waste gate valve may be configured to allow passage of the exhaust gas flowing through the bypass passage when the waste gate valve is open.

In the thus configured supercharging system, the supercharging operation of the compressor is performed by using energy that the turbine receives from exhaust gas. The energy that the turbine receives from exhaust gas correlates with the flow rate of exhaust gas, by extension, the intake air amount. When the waste gate valve is open in the situation in which the waste gate valve should be fully closed, the flow rate of exhaust gas passing through the turbine decreases, and the energy of the supercharging operation of the compressor decreases accordingly, with the result that the amount of increase in the supercharging pressure is smaller than a value that is estimated from the integrated value of the intake air amount. Thus, it is possible to suitably diagnose whether the waste gate valve is locked at a small opening degree on the basis of the integrated value of the intake air amount and the peak supercharging pressure.

In the above aspect, the supercharger may be a mechanical supercharger that supercharges the internal combustion engine by driving a compressor by using power of the internal combustion engine. The compressor is installed in an intake passage of the internal combustion engine. The supercharging pressure reduction mechanism may be a relief valve. The relief valve is provided at a portion downstream of the compressor in the intake passage of the internal combustion engine. The relief valve may be configured to emit part of intake air flowing through the portion to an outside when the relief valve is open. The relief valve may be configured to interrupt the emission of part of the intake air flowing through the portion when the relief valve is fully closed.

In the thus configured supercharging system, when the relief valve is open, part of intake air after supercharging is carried out by the compressor is emitted to the outside, and the supercharging pressure decreases. Therefore, when the relief valve is open in the situation in which the relief valve should be fully closed, the amount of increase in the supercharging pressure is smaller than a value that is estimated from the integrated value of the intake air amount. Thus, it is possible to suitably diagnose whether the relief valve is locked at a small opening degree on the basis of the integrated value of the intake air amount and the peak supercharging pressure.

A second aspect of the invention provides a diagnostic method for a supercharging system. The supercharging system includes an internal combustion engine, a supercharger, a supercharging pressure reduction mechanism, and an electronic control unit. The supercharger is configured to pressurize intake air flowing through an intake passage of the internal combustion engine and transfer the intake air to a combustion chamber of the internal combustion engine. The supercharging pressure reduction mechanism is configured to reduce a supercharging pressure. The supercharging pressure is a pressure of the intake air that is transferred to the combustion chamber by the supercharger. The diagnostic method includes obtaining, by the electronic control unit, an integrated value of an intake air amount during a predetermined period. The predetermined period is a period from a start of an increase in the supercharging pressure to an end of the increase at the time when the intake air amount is increased in a state where no command to reduce the supercharging pressure by the supercharging pressure reduction mechanism is issued. The diagnostic method further includes determining, by the electronic control unit, whether the supercharging system has an abnormality on the basis of a correlation between a peak supercharging pressure during the predetermined period and the integrated value of the intake air amount. The peak supercharging pressure is an amount of increase in the supercharging pressure.

There is a correlation between the integrated value of the intake air amount during the period from the start of an increase in the supercharging pressure to the end of the increase at the time when the supercharging pressure is increased with an increase in the intake air amount and the amount of increase in the supercharging pressure during the period. That is, there is a correlation between the integrated value of the intake air amount and the peak supercharging pressure. When the supercharging pressure is reduced because of an abnormality in the situation in which the supercharging pressure should not be reduced by the supercharging pressure reduction mechanism, the correlation between the integrated value of the intake air amount and the peak supercharging pressure changes. Even when the amount of reduction in the supercharging pressure due to the abnormality at this time is small, there appears a relatively large change in the correlation therebetween. Thus, when it is determined whether there is an abnormality on the basis of the correlation between the integrated value of the intake air amount and the peak supercharging pressure, it is possible to suitably diagnose such an abnormality that a change that appears in the supercharging pressure is relatively small.

In the above aspect, the electronic control unit may be configured to, when the integrated value of the intake air amount deviates to a positive side with respect to a value during normal times, which is estimated from the peak supercharging pressure, determine that the supercharging system has an abnormality.

In the above aspect, the electronic control unit may be configured to, when the peak supercharging pressure deviates to a negative side with respect to a value during normal times, which is estimated from the integrated value of the intake air amount, determine that the supercharging system has an abnormality.

The peak supercharging pressure exhibits a higher correlation with the integrated value of the amount of increase in the intake air amount from the start of an increase in the supercharging pressure than the integrated value of the intake air amount. Therefore, when the integrated value of the amount of increase in the intake air amount from the start of an increase in the supercharging pressure is used as the integrated value of the intake air amount, which is used to determine whether there is an abnormality, it is possible to further highly accurately carry out a diagnosis.

In the above aspect, the supercharger may be a turbocharger that supercharges the internal combustion engine by driving a compressor with the use of a turbine. The turbine is installed in an exhaust passage of the internal combustion engine and is operated by stream of exhaust gas flowing through the exhaust passage. The compressor is installed in the intake passage of the internal combustion engine. The supercharging pressure reduction mechanism may be a waste gate valve installed in a bypass passage. The bypass passage is a passage that bypasses the turbine and allows exhaust gas to flow. The waste gate valve may be configured to interrupt passage of the exhaust gas flowing through the bypass passage when the waste gate valve is fully closed. The waste gate valve may be configured to allow passage of the exhaust gas flowing through the bypass passage when the waste gate valve is open.

In the thus configured supercharging system, the supercharging operation of the compressor is performed by using energy that the turbine receives from exhaust gas. The energy that the turbine receives from exhaust gas correlates with the flow rate of exhaust gas, by extension, the intake air amount. When the waste gate valve is open in the situation in which the waste gate valve should be fully closed, the flow rate of exhaust gas passing through the turbine decreases, and the energy of the supercharging operation of the compressor decreases accordingly, with the result that the amount of increase in the supercharging pressure is smaller than a value that is estimated from the integrated value of the intake air amount. Thus, when it is determined whether there is an abnormality on the basis of the correlation between the integrated value of the intake air amount and the peak supercharging pressure, it is possible to suitably diagnose whether the waste gate valve is locked at a small opening degree.

In the above aspect, the supercharger may be a mechanical supercharger that supercharges the internal combustion engine by driving a compressor by using power of the internal combustion engine. The compressor is installed in the intake passage of the internal combustion engine. The supercharging pressure reduction mechanism may be a relief valve. The relief valve is provided at a portion downstream of the compressor in the intake passage of the internal combustion engine. The relief valve may be configured to emit part of intake air flowing through the portion to an outside when the relief valve is open. The relief valve may be configured to interrupt the emission of part of the intake air flowing through the portion to the outside when the relief valve is fully closed.

In the thus configured supercharging system, when the relief valve is open, part of intake air after supercharging is carried out by the compressor is emitted to the outside, and the supercharging pressure decreases. Therefore, when the relief valve is open in the situation in which the relief valve should be fully closed, the amount of increase in the supercharging pressure is smaller than a value that is estimated from the integrated value of the intake air amount. Thus, when it is determined whether there is an abnormality on the basis of the correlation between the integrated value of the intake air amount and the peak supercharging pressure, it is possible to suitably diagnose whether the relief valve is locked at a small opening degree.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Hereinafter, a supercharging system and a diagnostic method for a supercharging system according to a first embodiment will be described in detail with reference to FIG. 1 to FIG. 7.

Figure 1:
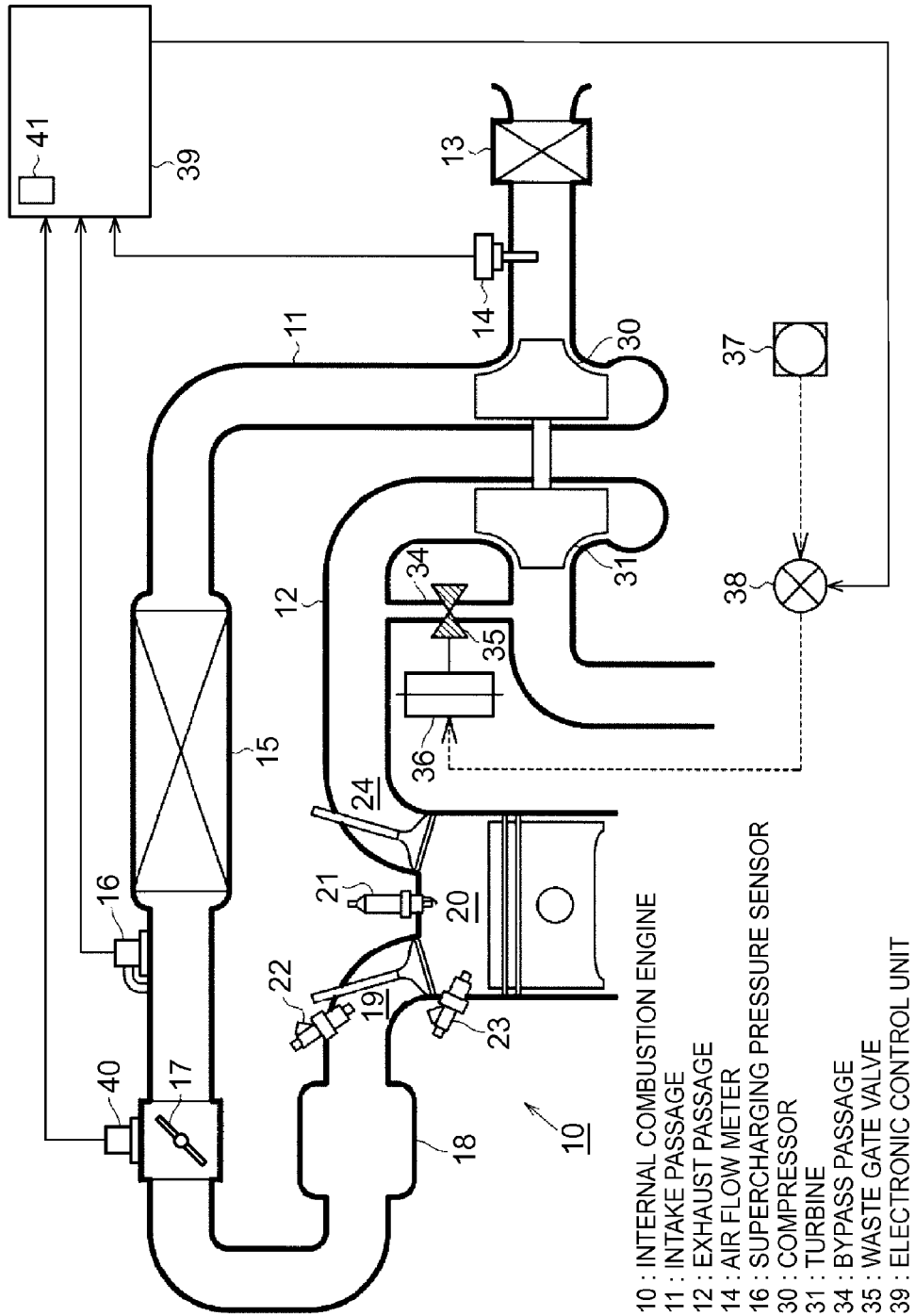
FIG. 1 is a view that schematically shows the configuration of a supercharging system according to a first embodiment.

As shown in FIG. 1, the supercharging system according to the present embodiment is a turbocharger including a compressor 30 and a turbine 31. The compressor 30 is installed in an intake passage 11 of an internal combustion engine 10. The turbine 31 is installed in an exhaust passage 12 of the internal combustion engine 10. The compressor 30 and the turbine 31 are mechanically coupled to each other. The compressor 30 is configured to be driven in an interlocked manner with the operation of the turbine 31 due to the stream of exhaust gas, and perform supercharging operation.

An air cleaner 13 and an air flow meter 14 are provided at a portion upstream of the compressor 30 in the intake passage 11 of the internal combustion engine 10. The air cleaner 13 purifies intake air. The air flow meter 14 serves as an intake air flow rate detecting unit that detects the flow rate of intake air passing through the intake passage 11 (intake air amount GA). On the other hand, an intercooler 15, a supercharging pressure sensor 16, a throttle valve 17 and a surge tank 18 are provided in order from the upstream side at a portion downstream of the air flow meter 14 in the intake passage 11. The intercooler 15 cools intake air. The supercharging pressure sensor 16 serves as a supercharging pressure detecting unit that detects a supercharging pressure P. The throttle valve 17 regulates the intake air amount GA. The surge tank 18 is a volume unit for suppressing pulsation of intake air. The supercharging pressure sensor 16 is configured to detect the differential pressure, as the supercharging pressure P, between atmospheric pressure and the absolute pressure of intake air at a portion between the compressor 30 and the throttle valve 17 in the intake passage 11.

A port injector 22 is provided in an intake port 19 in the internal combustion engine 10. The intake port 19 is a connecting portion that connects the intake passage 11 with a combustion chamber 20 of the internal combustion engine 10. The port injector 22 injects fuel into intake air flowing through the intake port 19. A cylinder injector 23 and an ignition plug 21 are provided in the combustion chamber 20. The cylinder injector 23 injects fuel into the combustion chamber 20. The ignition plug 21 ignites air-fuel mixture with spark. The air-fuel mixture is introduced into the combustion chamber 20. The exhaust passage 12 is connected to the combustion chamber 20 via an exhaust port 24. The turbine 31 is installed in the exhaust passage 12.

The supercharging system includes a waste gate valve 35 as a supercharging pressure reduction mechanism. The waste gate valve 35 is provided in a bypass passage 34. The bypass passage 34 is provided so as to connect a portion upstream of the turbine 31 to a portion downstream of the turbine 31 in the exhaust passage 12. The waste gate valve 35 closes the bypass passage 34 and interrupts passage of exhaust gas through the bypass passage 34 when the waste gate valve 35 is fully closed, and allows passage of exhaust gas when the waste gate valve 35 is open.

The waste gate valve 35 is coupled to a negative pressure-driven diaphragm 36. The opening degree of the waste gate valve 35 is changed in response to the magnitude of negative pressure introduced to the diaphragm 36. The diaphragm 36 is connected to a negative pressure pump 37 via a negative pressure regulating valve 38. The negative pressure pump 37 is operated by the rotation of a camshaft (not shown) of the internal combustion engine 10, and generates negative pressure. In this internal combustion engine 10, a vane-type mechanical pump is employed as the negative pressure pump 37. The negative pressure regulating valve 38 is an electromagnetic valve that regulates the magnitude of negative pressure that is introduced to the diaphragm 36 in accordance with energization control.

The internal combustion engine 10 provided with the thus configured supercharging system is controlled by an electronic control unit 39. The electronic control unit 39 includes a central processing unit (CPU), a read-only memory (ROM), and a random access memory (RAM). The CPU executes various pieces of arithmetic processing for engine control. Programs and data for control are stored in the ROM. The RAM temporarily stores computed results of the CPU, detected results of sensors, and the like.

Detected signals of various sensors in addition to the above-described air flow meter 14 and supercharging pressure sensor 16 are input to the electronic control unit 39. The various sensors that detect the operation states of the internal combustion engine 10 include a throttle sensor 40, and the like. The throttle sensor 40 detects the opening degree of the throttle valve 17 (throttle opening degree TA). An atmospheric pressure sensor 41 is incorporated in the electronic control unit 39. The atmospheric pressure sensor 41 detects atmospheric pressure. In this supercharging system, energization control over the negative pressure regulating valve 38 is also executed by the electronic control unit 39. The electronic control unit 39 has not only the function as a controller for the internal combustion engine 10 but also the function as an abnormality determination unit that determines whether the supercharging system has an abnormality.

The thus configured electronic control unit 39 diagnoses whether the waste gate valve 35 is locked at a small opening degree (small-opening locking), as an abnormality diagnosis of the supercharging system. The small-opening locking is such an abnormality that the waste gate valve 35 is locked at a position slightly close to an open side from a fully closed position and becomes not completely closed. Here, where the opening degree of the waste gate valve 35 (WGV opening degree) is indicated by a valve open angle from the fully closed position (the WGV opening degree at a fully open position=90°), the state where the waste gate valve 35 is locked at a position at which the WGV opening degree is smaller than 5° is defined as the small-opening locking.

During the small-opening locking, the waste gate valve 35 is not completely closed, and a slight amount of exhaust gas leaks and flows through the bypass passage 34. Therefore, the flow rate of exhaust gas passing through the turbine 31 decreases accordingly. However, the amount of the decrease is small, so influence that appears as a change in supercharging pressure or intake air amount is limited. In the present embodiment, a diagnostic method that is able to accurately detect such small-opening locking is employed. Hereinafter, such a diagnostic method of diagnosing whether the waste gate valve 35 is locked at a small opening degree in the present embodiment will be described.

Figure 2:
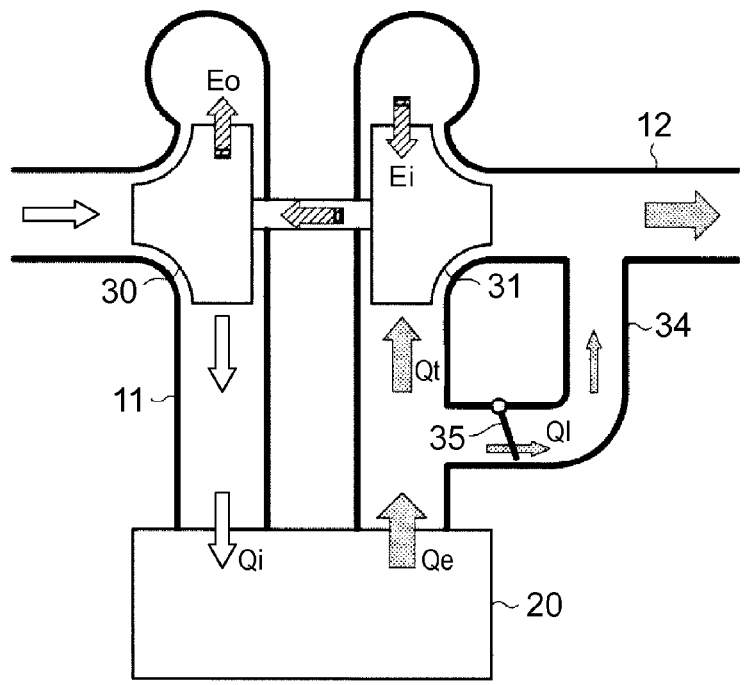
FIG. 2 is a model view that shows movement of energy in the first embodiment.

As shown in FIG. 2, in the supercharging system, the supercharging operation of the compressor 30 is performed by using energy Ei that the turbine 31 receives from exhaust gas passing through the turbine 31. The energy Ei that the turbine 31 receives from exhaust gas has a positive correlation with the flow rate of exhaust gas passing through the turbine 31 (turbine passage exhaust flow rate Qt). If the waste gate valve 35 is fully closed, the turbine passage exhaust flow rate Qt is equal to the total flow rate of exhaust gas that is emitted from the combustion chamber 20 (total exhaust flow rate Qe) (Qt=Qe).

On the other hand, the total exhaust flow rate Qe has a correlation with the flow rate of intake air flowing into the combustion chamber 20 (cylinder inflow air amount Qi) and, by extension, the intake air amount GA. Thus, energy Eo of the supercharging operation of the compressor 30 when the waste gate valve 35 is fully closed has a correlation with the intake air amount GA.

In contrast, when the waste gate valve 35 is locked at a small opening degree, a slight amount of exhaust gas flows through the bypass passage 34 via the waste gate valve 35 that is not fully closed. At this time, the turbine passage exhaust flow rate Qt is smaller than the total exhaust flow rate Qe by the flow rate of exhaust gas in the bypass passage 34 (leakage flow rate Ql) (Qt=Qe−Ql). That is, the energy Eo of the supercharging operation of the compressor 30 at this time is slightly smaller than a value that is estimated from the intake air amount GA.

More strictly, because the supercharging operation of the compressor 30 has a loss due to friction resistance, and the like, the energy Eo of the supercharging operation of the compressor 30 is smaller than the energy Ei that the turbine 31 receives from exhaust gas. The amount of loss of such energy (=Ei−Eo) becomes a value based on the intake air amount GA at the time when the compressor 30 starts the supercharging operation. Thus, the energy Eo of the supercharging operation of the compressor 30 exhibits a relatively high correlation with the amount of increase in the intake air amount GA from the start of the supercharging operation.

Figure 3:
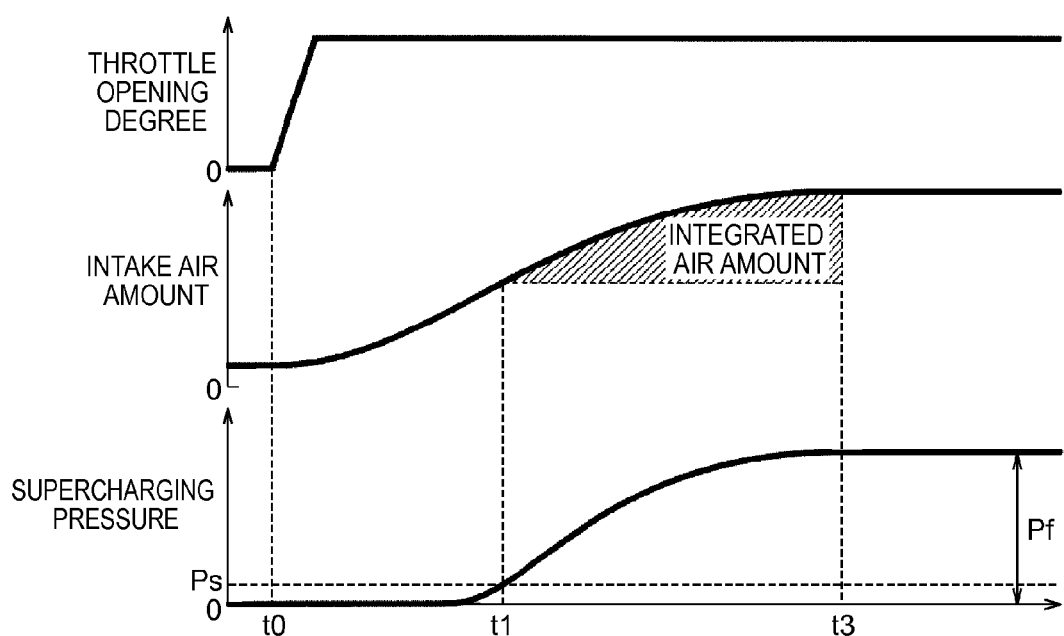
FIG. 3 is a time chart that shows changes in throttle opening degree, intake air amount and supercharging pressure during normal times in the supercharging system according to the first embodiment.

FIG. 3 shows changes in throttle opening degree TA, intake air amount GA and supercharging pressure P during acceleration of the internal combustion engine 10 at the time when the waste gate valve 35 is normally functioning. At time t0 in the chart, when the throttle opening degree TA is increased from "0", the intake air amount GA is gradually increased thereafter.

On the other hand, an increase in the supercharging pressure P is started after passage of the following processes (A) to (E). A shift of these processes is accompanied by a delay of transfer of intake air or exhaust gas. Therefore, an increase in the supercharging pressure P starts after a while from the start of an increase in the intake air amount GA. (A) An increase in the intake air amount GA with an increase in the throttle opening degree TA (B) An increase in the cylinder inflow air amount with an increase in the intake air amount GA (C) An increase in the amount of exhaust gas emitted from the combustion chamber 20 (total exhaust flow rate Qe) with an increase in the cylinder inflow air amount (D) An increase in the turbine passage exhaust flow rate Qt with an increase in the total exhaust flow rate Qe (E) An increase in the amount of operation of the turbine 31, by extension, the amount of the supercharging operation of the compressor 30, with an increase in the turbine passage exhaust flow rate Qt There are large variations in a response delay time to the start of supercharging, and it is difficult to predict the response delay time. Therefore, in the present embodiment, the time when the supercharging pressure P becomes higher than or equal to a prescribed supercharging start pressure Ps is regarded as supercharging start time (the start of an increase in the supercharging pressure P). The supercharging start pressure Ps is set to a pressure slightly higher than the maximum value of the supercharging pressure P at the time when the waste gate valve 35 is fully open.

When supercharging is started, the intake air amount GA and the supercharging pressure P increase thereafter for a while through repeated cycles of an increase in the cylinder inflow air amount resulting from an increase in the supercharging pressure P, an increase in the turbine passage exhaust flow rate Qt, an increase in the amount of supercharging operation of the compressor 30 and a further increase in the supercharging pressure P. However, those increases saturate at last, with the result that the intake air amount GA and the supercharging pressure P converge to certain values. Hereinafter, the supercharging pressure P at this time, that is, at the end of the increases, is referred to as a peak supercharging pressure Pf.

As described above, the energy Eo of the supercharging operation of the compressor 30 correlates with the amount of increase in the flow rate of intake air from the start of supercharging. Here, the intake air amount GA at time t1 in the chart, at which the supercharging pressure P exceeds the supercharging start pressure Ps, is regarded as the amount of intake air at the start of supercharging. In this case, the total amount of the energy Eo of the supercharging operation of the compressor 30 during the period from time t1 to time t3, that is, the period from the start of an increase in the supercharging pressure P to the end of the increase, corresponds to the area of the region indicated by hatching in the chart. At time t3, the supercharging pressure P reaches the peak supercharging pressure Pf. The energy Eo of the supercharging operation of the compressor 30 is expended in an increase in the supercharging pressure P, so the total amount of the energy Eo correlates with the amount of increase in the supercharging pressure P during the above period, that is, the peak supercharging pressure Pf.

The area of this region is an integrated value of the amount of increase in the intake air amount GA from the start of an increase in the supercharging pressure P during the period from time t1 to time t3. In the following description, such an integrated value is referred to as integrated air amount TGA.

Figure 4:
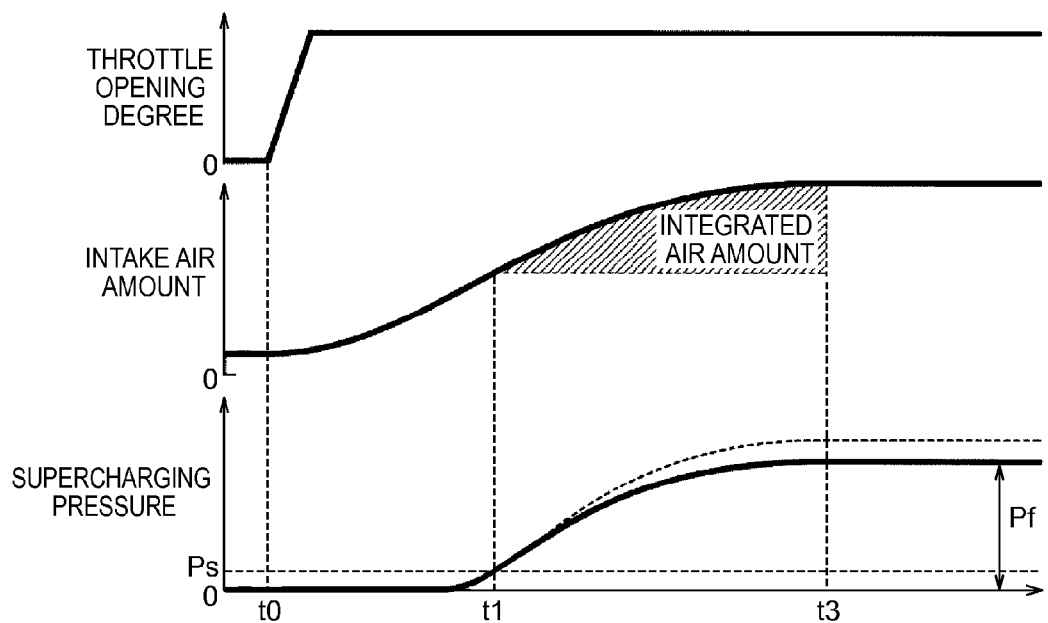
FIG. 4 is a time chart that shows changes in throttle opening degree, intake air amount and supercharging pressure during small-opening locking in the supercharging system according to the first embodiment.

FIG. 4 shows changes in throttle opening degree TA, intake air amount GA and supercharging pressure P during acceleration of the internal combustion engine 10 in the case where the waste gate valve 35 is locked at a small opening degree. In this chart, changes in supercharging pressure P during normal times, shown in FIG. 3, are also shown by the dashed line. Actually, the influence of the small-opening locking also appears in the intake air amount GA; however, for the sake of easy illustration, it is assumed that the intake air amount GA changes as in the case during normal times, shown in FIG. 3.

As described above, when there occurs the small-opening locking, the turbine passage exhaust flow rate Qt becomes smaller than the total exhaust flow rate Qe. Therefore, the energy Eo of the supercharging operation of the compressor 30 is smaller than a value that is estimated from the intake air amount GA (the amount of increase in the intake air amount GA from the start of an increase in the supercharging pressure P). Thus, even when the integrated air amount TGA is the same, the peak supercharging pressure Pf at this time is smaller than the peak supercharging pressure Pf during normal times. In other words, in the case where the peak supercharging pressure Pf is the same, the integrated air amount TGA during the small-opening locking is larger than the integrated air amount TGA during normal times.

Figure 5:
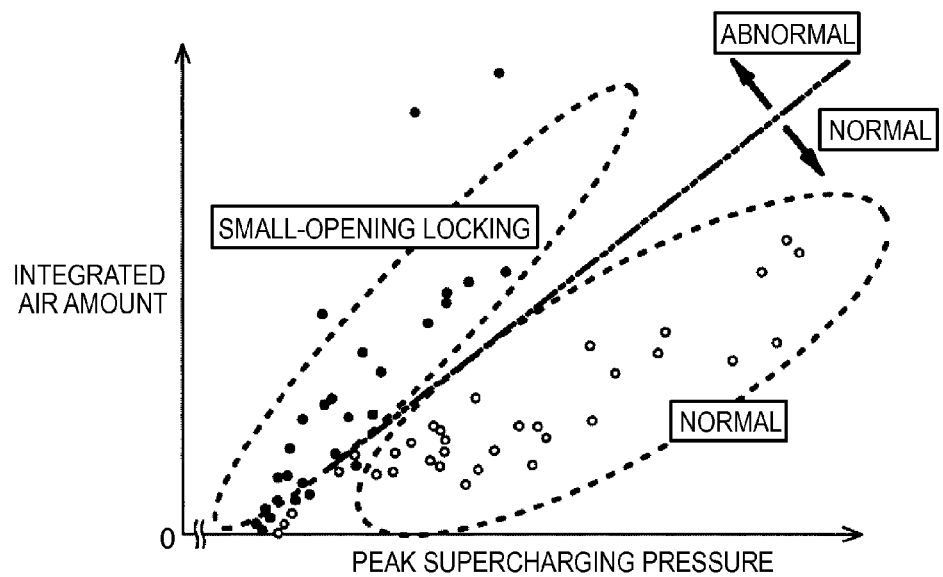
FIG. 5 is a graph that shows plotted measured results of integrated air amounts and peak supercharging pressures in the supercharging system during normal times and during small-opening locking in the supercharging system.

FIG. 5 is a graph that shows plotted measured results of the integrated air amounts TGA and the peak supercharging pressures Pf during normal times and during small-opening locking. As shown in the graph, in the region in which the peak supercharging pressure Pf is higher than a certain level, there is a distinct difference between the distribution range of the measured results during normal times and the distribution range of the measured results during the small-opening locking. In the graph, a boundary line between those distribution ranges is indicated by the alternate long and two-short dashed line. It is possible to determine whether there occurs the small-opening locking by measuring the integrated air amount TGA and the peak supercharging pressure Pf and looking into on which side of the boundary line the measured results are located when the measured results are plotted in the graph.

In this way, by looking into the relationship between the peak supercharging pressure Pf and the integrated air amount TGA, it is possible to diagnose whether there is the small-opening locking. Therefore, in the present embodiment, it is determined whether the supercharging system has an abnormality on the basis of the relationship between the integrated air amount TGA and the peak supercharging pressure Pf at the time when the internal combustion engine 10 is accelerated, that is, at the time when the flow rate of intake air is increased, in a state where a command to fully close the waste gate valve 35 is issued.

Figure 6:
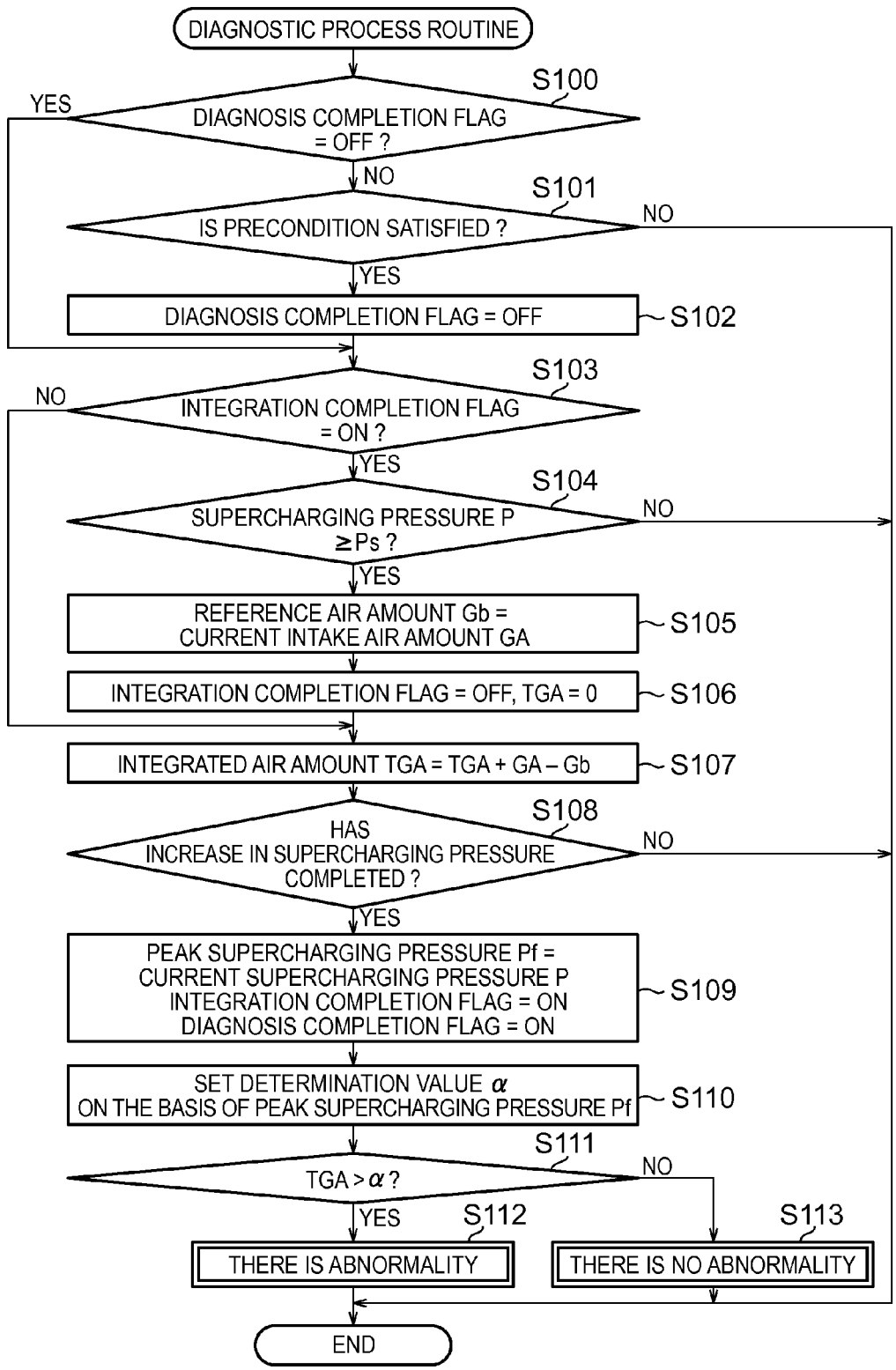
FIG. 6 is a flowchart that shows the procedure of a diagnostic process routine that is executed in the supercharging system.

FIG. 6 shows the flowchart of a diagnostic process routine that is executed for such a diagnosis. The process of the routine is repeatedly executed at prescribed control intervals by the electronic control unit 39 during operation of the internal combustion engine 10.

When the process of the routine is started, it is initially determined in step S100 whether a diagnosis completion flag is cleared (in an off state). When the diagnosis completion flag is cleared (YES), the process proceeds to step S103; whereas, when the diagnosis completion flag is set (in an on state) (NO), the process proceeds to step S101.

When the process proceeds to step S101, it is determined in step S101 whether a precondition for a diagnosis is satisfied. The precondition is satisfied when all the requirements, such as the requirement that a command to fully close the waste gate valve 35 is issued and the requirement that it is the time to start the acceleration of the internal combustion engine 10. Whether a command to fully close the waste gate valve 35 is issued is, for example, determined on the basis of whether the amount of energization of the negative pressure regulating valve 38 is set to the value of the fully closed state of the negative pressure regulating valve 38. Whether it is the time to start the acceleration of the internal combustion engine 10 is, for example, determined on the basis of whether the throttle opening degree TA or the depression amount of an accelerator pedal is increased from "0" to a value higher than or equal to a certain value just before. It is possible to further increase the diagnostic accuracy by incorporating the requirements based on the intake air temperature and coolant temperature of the internal combustion engine 10, an outside air temperature, atmospheric pressure, and the like, into the precondition, and limiting the ranges of those values, in which a diagnosis is carried out.

When the precondition is not satisfied (NO), the process of the current routine is directly ended. On the other hand, when the precondition is satisfied (YES), the diagnosis completion flag is cleared (set to the off state) in step S102, and then the process proceeds to step S103.

When the process proceeds to step S103, it is determined in step S103 whether an integration completion flag is set (in an on state). When the integration completion flag is set (YES), the process proceeds to step S104; whereas, when the integration completion flag is cleared (set to an off state) (NO), the process proceeds to step S107.

When the process proceeds to step S104, it is determined in step S104 whether the supercharging pressure P is higher than or equal to the above-described supercharging start pressure Ps, that is, whether an increase in the supercharging pressure P is started. When the supercharging pressure P is higher than or equal to the supercharging start pressure Ps (YES), the process proceeds to step S105; otherwise (NO), that is, when supercharging has not been started yet, the current process is directly ended.

When the process proceeds to step S105, the current intake air amount GA detected by the air flow meter 14 is set for a reference air amount Gb. In subsequent step S106, the integration completion flag is cleared (set to the off state), and the integrated air amount TGA is reset to "0". After that, the process proceeds to step S107.

When the process proceeds to step S107, the integrated air amount TGA is updated in step S107. The integrated air amount TGA is updated by adding a value (GA−Gb), obtained by subtracting the reference air amount Gb from the detected current intake air amount GA, to the previous integrated air amount TGA.

Subsequently, in step S108, it is determined whether an increase in the supercharging pressure P in the current acceleration of the internal combustion engine 10 has completed. This determination is, for example, carried out on the basis of whether the state where the rate of increase in the intake air amount GA is near "0" or is a negative value has continued for a predetermined time or longer. When an increase in the supercharging pressure P has completed (YES), the process proceeds to step S109; whereas, when the increase is still continuing (NO), the process of the current routine is directly ended.

When the process proceeds to step S109, the current supercharging pressure P detected by the supercharging pressure sensor 16 is set for the peak supercharging pressure Pf. In addition, in step S109, the integration completion flag and the diagnosis completion flag each are set (to the on state).

Subsequently, in step S110, a determination value $\alpha$ is set on the basis of the peak supercharging pressure Pf. The determination value $\alpha$ at this time is set to a value slightly smaller than the lower limit value of the range of the integrated air amount TGA that is estimated from the peak supercharging pressure Pf during normal times on the assumption that the supercharging system is normal.

Figure 7:
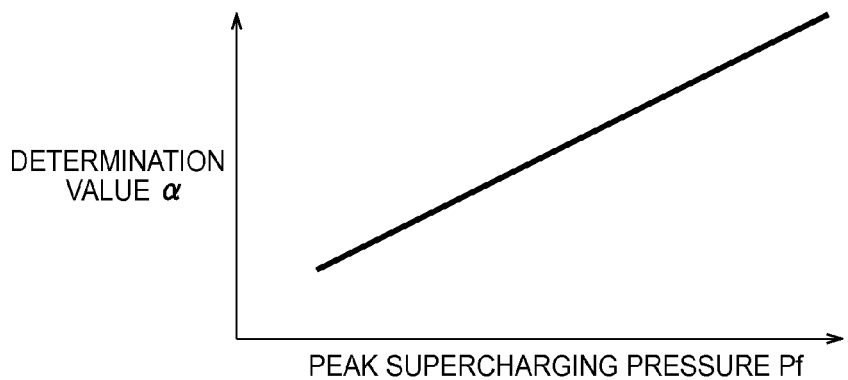
FIG. 7 is a graph that shows the correlation between a peak supercharging pressure and a determination value that is computed through the diagnostic process routine.

FIG. 7 shows the correlation between the peak supercharging pressure Pf and the determination value $\alpha$ in an example of a computing map that is used to set the determination value $\alpha$ at this time. This computing map is prestored in the ROM of the electronic control unit 39. As shown in the graph, the determination value $\alpha$ at the time when the peak supercharging pressure Pf is high is set to a value larger than the determination value $\alpha$ at the time when the peak supercharging pressure Pf is low.

When the determination value $\alpha$ is set, it is determined in subsequent step S111 whether the integrated air amount TGA is larger than the determination value $\alpha$. When the integrated air amount TGA is larger than the determination value $\alpha$ (YES), it is determined in step S112 that the supercharging system has an abnormality. On the other hand, when the integrated air amount TGA is smaller than or equal to the determination value $\alpha$ (NO), it is determined in step S113 that the supercharging system has no abnormality. After the determination, the process of the current routine is ended.

According to the result of the above-described diagnostic process routine, a diagnosis is carried out as follows. Until the precondition of a diagnosis is satisfied, the diagnosis completion flag and the integration completion flag both are set (in the on state). In the routine at this time, no specific process associated with a diagnosis is specifically carried out.

When the acceleration of the internal combustion engine 10 is started in the state where a command to fully close the waste gate valve 35 is issued and the precondition is satisfied, the diagnosis completion flag is cleared (set to the off state). After the start of an increase in the intake air amount GA in response to the start of the acceleration of the internal combustion engine 10, when the period of a delay in response of supercharging elapses and an increase in the supercharging pressure P is started, the supercharging pressure P exceeds the supercharging start pressure Ps, and the integration completion flag is cleared (set to the off state). At this time, the intake air amount GA detected by the air flow meter 14 at that time is set for the reference air amount Gb. From this time point, integration of the intake air amount GA, more specifically, integration of the value obtained by subtracting the reference air amount Gb from the intake air amount GA detected by the air flow meter 14 at that time, is started.

After that, when the current increase in the supercharging pressure P resulting from the acceleration of the internal combustion engine 10 completes, the supercharging pressure P detected by the supercharging pressure sensor 16 at that time is set for the peak supercharging pressure Pf. The determination value α is set on the basis of the peak supercharging pressure Pf. The determination value α at this time is set to a value slightly smaller than the lower limit value of the range of the integrated air amount TGA that is estimated from the peak supercharging pressure Pf during normal times on the assumption that the supercharging system is normal. It is determined whether the supercharging system has an abnormality on the basis of whether the integrated air amount TGA at that time is larger than the determination value α.

When the supercharging system is normal, the integrated air amount TGA at that time falls within the range of a value that is estimated from the peak supercharging pressure Pf at that time. Therefore, the integrated air amount TGA at this time is smaller than or equal to the determination value α, and it is determined that there is no abnormality.

On the other hand, when the waste gate valve 35 is locked at a small opening degree, part of exhaust gas leaks and flows through the waste gate valve 35 and does not pass through the turbine 31, so the turbine passage exhaust flow rate Qt is smaller than the amount that is estimated from the intake air amount GA. Therefore, the peak supercharging pressure Pf at this time does not increase to the value that is estimated from the integrated air amount TGA. That is, the integrated air amount TGA at this time is larger than the value that is estimated from the peak supercharging pressure Pf. Thus, at this time, the integrated air amount TGA is larger than the determination value α, so it is determined that there is an abnormality.

With the above-described supercharging system and the diagnostic method for the supercharging system according to the present embodiment, the following advantageous effects are obtained.

(1) In the present embodiment, in the state where a command to fully close the waste gate valve 35 is issued, the integrated air amount TGA is obtained. The integrated air amount TGA corresponds to the integrated value of the flow rate of intake air during the period from the start of an increase in the supercharging pressure P to the end of the increase at the time when the flow rate of intake air is increased. It is determined whether the supercharging system has an abnormality on the basis of the correlation between the peak supercharging pressure Pf, which is the supercharging pressure at the end of the increase, and the integrated air amount TGA. When the waste gate valve 35 is locked at small opening degree, the flow rate of exhaust gas that passes through the turbine 31 is smaller than the flow rate that is estimated from the flow rate of intake air, and the amount of increase in the supercharging pressure P during the above period is smaller than the amount that is estimated from the integrated value of the flow rate of intake air during the period. Therefore, it is possible to highly accurately detect whether the waste gate valve 35 is locked at a small opening degree on the basis of the correlation between the peak supercharging pressure Pf and the integrated air amount TGA.

(2) Because the integrated value of the amount of increase in the flow rate of intake air (intake air amount GA) from the start of an increase in the supercharging pressure P, which more highly correlates with the peak supercharging pressure Pf than the integrated value of the flow rate of intake air, is used in determination, a highly accurate diagnosis is possible.

Second Embodiment

Next, a supercharging system and a diagnostic method for a supercharging system according to a second embodiment will be described in detail with reference to FIG. 8 and FIG. 9. In the present embodiment and the following third embodiment, like reference numerals denote similar components to those of the above-described embodiment, and the detailed description thereof is omitted.

In the first embodiment, it is determined whether there is an abnormality by comparing the integrated air amount TGA with the determination value α set on the basis of the peak supercharging pressure Pf. In contrast, in the present embodiment, a determination value is obtained from the integrated air amount TGA, and such a determination is carried out by comparing the peak supercharging pressure Pf with the determination value.

Figure 8:
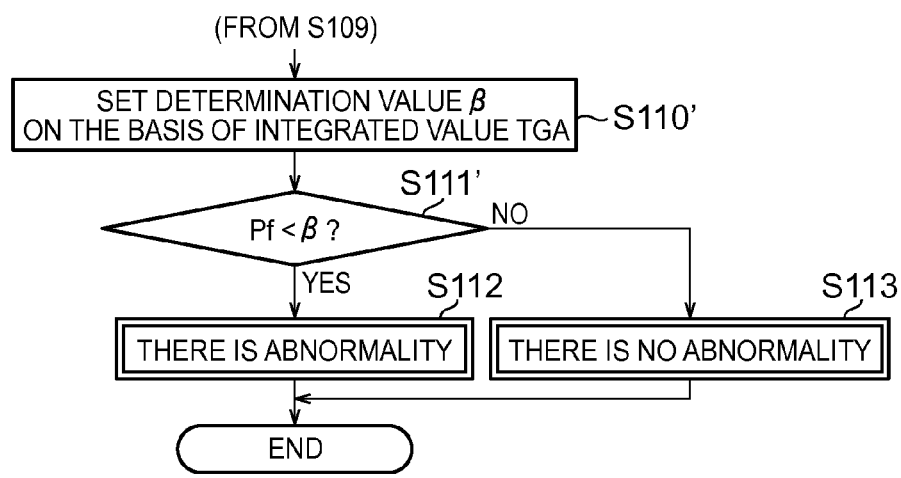
FIG. 8 is a flowchart that shows part of the procedure of a diagnostic process routine in a supercharging system and a diagnostic method for the supercharging system according to a second embodiment.

FIG. 8 shows a portion changed in such a case from the diagnostic process routine shown in FIG. 6. In this case, instead of the processes of step S110 and step S111 in the diagnostic process routine shown in FIG. 6, the following processes of step S110' and step S111' are executed.

The process of step S110' in the flowchart is executed after the process of step S109 in FIG. 6. In step S110', a determination value β is set on the basis of the integrated air amount TGA. The determination value β at this time is set to a value slightly larger than the upper limit value of the range of the peak supercharging pressure Pf that is estimated from the integrated air amount TGA during normal times on the assumption that the supercharging system is normal.

Figure 9:
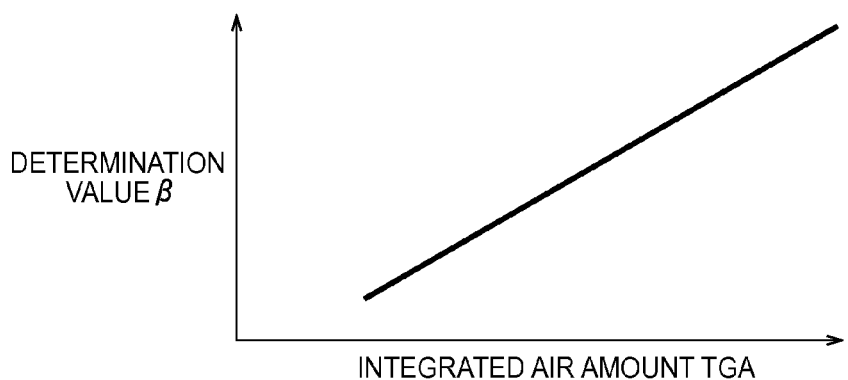
FIG. 9 is a graph that shows the correlation between an integrated air amount and a determination value that is computed through the diagnostic process routine.

FIG. 9 shows the correlation between the integrated air amount TGA and the determination value β in an example of a computing map that is used to set the determination value β at this time. This computing map is prestored in the ROM of the electronic control unit 39. As shown in the graph, the determination value β at the time when the integrated air amount TGA is large is set to a value smaller than the determination value β at the time when the integrated air amount TGA is small.

When the determination value β is set, it is determined in subsequent step S111' whether the peak supercharging pressure Pf is smaller than the determination value β. When the peak supercharging pressure Pf is smaller than the determination value β (YES), it is determined in step S112 that the supercharging system has an abnormality. On the other hand, when the peak supercharging pressure Pf is higher than or equal to the determination value β (NO), it is determined in step S113 that the supercharging system has no abnormality. After the determination, the process of the current routine is ended. In such a case, as in the case of the first embodiment, it is possible to determine whether the supercharging system has an abnormality.

Third Embodiment

The diagnostic methods according to the above-described embodiments are applicable to a supercharging system including a mechanical supercharger.

Figure 10:
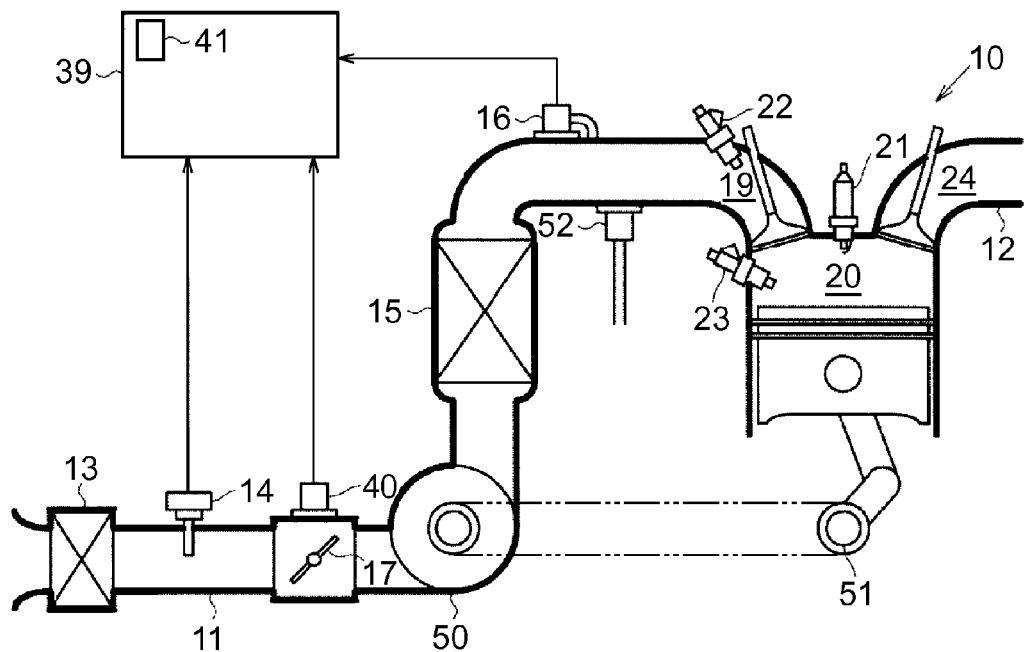
FIG. 10 is a view that schematically shows the configuration of a supercharging system according to a third embodiment.

FIG. 10 shows an example of a supercharging system including a mechanical supercharger. The mechanical supercharging system includes a compressor 50 installed in the intake passage 11 of the internal combustion engine 10. The compressor 50 is drivably coupled to a crankshaft 51 that is the output shaft of the internal combustion engine 10. The compressor 50 is configured to be driven by the power of the internal combustion engine 10 and supercharge the internal combustion engine 10.

The air cleaner 13, the air flow meter 14 and the throttle valve 17 are installed in order from the most upstream portion toward the downstream side at a portion upstream of the compressor 50 in the intake passage 11 of the internal combustion engine 10. The intercooler 15 and the supercharging pressure sensor 16 are installed at a portion downstream of the compressor 50 in the intake passage 11. The intercooler 15 cools intake air.

In addition, a relief valve 52 is installed at a portion downstream of the compressor 50 in the intake passage 11. The relief valve 52 is configured as a normally closed check valve. The relief valve 52 opens and emits part of intake air to the outside when the intake air pressure at the portion at which the valve is installed in the intake passage 11 exceeds a certain value. Thus, the relief valve 52 functions as a supercharging pressure reduction mechanism that reduces the supercharging pressure when the supercharging pressure is excessively high.

Such the relief valve 52 of the supercharging system can also be locked at a small opening degree (small-opening locking). That is, the relief valve 52 can be locked at a position slightly close to the valve open side from the fully closed position and become not completely closed. In such a case, in the situation in which the relief valve 52 should be fully closed, a slight amount of intake air leaks through the relief valve 52, so the supercharging pressure is slightly lower than the intended pressure. Therefore, when the relief valve 52 is locked at a small opening degree, as in the case where the waste gate valve 35 is locked at a small opening degree, there occurs a change in the relationship between the integrated air amount TGA and the peak supercharging pressure Pf. Thus, by using the diagnostic methods according to the above-described embodiments, it is possible to suitably diagnose whether the relief valve 52 in the supercharging system including a mechanical supercharger is locked at a small opening degree. In this case as well, it is possible to compute the integrated air amount TGA on the basis of the intake air amount GA that is detected by the air flow meter 14; however, the peak supercharging pressure Pf strictly correlates with the flow rate of intake air flowing into the compressor 50.

The above-described embodiments may be modified into the following alternative embodiments. In the above-described embodiments, the start of an increase in the supercharging pressure P is determined on the basis of the fact that the supercharging pressure P becomes higher than or equal to the predetermined value (supercharging start pressure Ps); however, the determination may be carried out by another method. For example, it is also possible to carry out such a determination on the basis of the rate of change in the supercharging pressure P, the rate of change in the intake air amount GA and an elapsed time from the start of acceleration.

In the above-described embodiments, the end of an increase in the supercharging pressure P is determined on the basis of the rate of increase in the intake air amount GA; however, the determination may be carried out by another method. For example, it is possible to carry out such a determination on the basis of the rate of change in the supercharging pressure P or an elapsed time from the start of supercharging.

In the above-described embodiments, the integrated air amount TGA is computed as the integrated value of the amount of increase in the intake air amount GA from the intake air amount GA at the start of an increase in the supercharging pressure P. Instead, the integrated air amount TGA may be computed as the integrated value of the intake air amount GA.

In an internal combustion engine on which a fuel vapor purge processing system or an exhaust gas recirculation system, the flow rate of intake air flowing into the combustion chamber 20 can be larger than the intake air amount GA detected by the air flow meter 14. In the case of a supercharging system provided in such an internal combustion engine, it is possible to carry out a diagnosis with further high accuracy as long as the integrated air amount TGA is computed using a value obtained by adding the flow rate of gas that merges at a halfway portion to the intake air amount GA.

The flow rate of intake air flowing into the combustion chamber 20 may be obtained from a value other than the intake air amount GA detected by the air flow meter 14. For example, it is also possible to obtain the flow rate of intake air, flowing into the combustion chamber 20, through computation based on the supercharging pressure P.

In the above-described embodiments, the supercharging pressure sensor 16 detects the differential pressure between atmospheric pressure and the absolute pressure of intake air at a portion downstream of the compressor 30 in the intake passage 11, and detects the differential pressure between the absolute pressure of intake air and atmospheric pressure as the supercharging pressure P. Instead, a sensor that detects the absolute pressure of intake air at the above portion may be used. In such a state as well, when a value obtained by subtracting separately detected atmospheric pressure from the sensor just needs to be obtained as the supercharging pressure P, a diagnosis is allowed to be carried out as in the case of the above-described embodiments. It is also possible to carry out a diagnosis by using such an absolute pressure as the supercharging pressure P directly.

In the internal combustion engine 10, only the port injector 22 may be installed in the intake port 19. In the internal combustion engine 10, only the cylinder injector 23 may be installed in the combustion chamber 20.

What is claimed is:

1. A supercharging system comprising:
an internal combustion engine;
a supercharger configured to supercharge the internal combustion engine;
a supercharging pressure reduction mechanism configured to reduce a supercharging pressure;
a first sensor configured to detect an intake air amount of the internal combustion engine;
a second sensor configured to detect the supercharging pressure; and
an electronic control unit configured to
compute an integrated value of the intake air amount during a predetermined period on the basis of a detected result of the first sensor, the predetermined period being a period from a start of an increase in the supercharging pressure to an end of the increase at the time when the intake air amount is increased in a state where no command to reduce the supercharging pressure by the supercharging pressure reduction mechanism is issued,
acquire a peak supercharging pressure from a detected result of the second sensor, the peak supercharging pressure being an amount of increase in the supercharging pressure during the predetermined period, and
determine whether the supercharging system has an abnormality on the basis of the integrated value of the intake air amount and the peak supercharging pressure.

2. The supercharging system according to claim 1, wherein
the electronic control unit is configured to
set a determination value, the determination value at the time when the peak supercharging pressure is a first pressure being larger than the determination value at the time when the peak supercharging pressure is a second pressure, wherein the first pressure is higher than the second pressure, and
when the integrated value of the intake air amount is larger than the determination value, determine that the supercharging system has an abnormality.

3. The supercharging system according to claim 1, wherein
the electronic control unit is configured to
set a determination value, the determination value at the time when the integrated value of the intake air amount is a first integrated value being larger than the determination value at the time when the integrated value is a second integrated value, wherein the first integrated value is larger than the second integrated value, and
when the peak supercharging pressure is lower than the determination value, determine that the supercharging system has an abnormality.

4. The supercharging system according to claim 1, wherein
the electronic control unit is configured to compute the integrated value of the intake air amount as a value through integration of a value, obtained by subtracting a second intake air amount from a first intake air amount, during the predetermined period, the first intake air amount being the intake air amount detected at the start of an increase in the supercharging pressure, the second intake air amount being the intake air amount detected currently.

5. The supercharging system according to claim 1, wherein
the supercharger is a turbocharger that supercharges the internal combustion engine by driving a compressor with the use of a turbine, the turbine is installed in an exhaust passage of the internal combustion engine and is operated by stream of exhaust gas flowing through the exhaust passage, the compressor is installed in an intake passage of the internal combustion engine,
the supercharging pressure reduction mechanism is a waste gate valve installed in a bypass passage, the bypass passage is a passage that bypasses the turbine and allows the exhaust gas to flow, and
the waste gate valve is configured to
interrupt passage of the exhaust gas flowing through the bypass passage when the waste gate valve is fully closed, and
allow passage of the exhaust gas flowing through the bypass passage when the waste gate valve is open.

6. The supercharging system according to claim 1, wherein
the supercharger is a mechanical supercharger that supercharges the internal combustion engine by driving a compressor by using power of the internal combustion engine, the compressor is installed in an intake passage of the internal combustion engine,
the supercharging pressure reduction mechanism is a relief valve, the relief valve is provided at a portion downstream of the compressor in the intake passage of the internal combustion engine, and
the relief valve is configured to
emit part of intake air flowing through the portion to an outside when the relief valve is open, and
interrupt the emission of part of the intake air flowing through the portion when the relief valve is fully closed.

7. A diagnostic method for a supercharging system, the supercharging system including an internal combustion engine, a supercharger, a supercharging pressure reduction mechanism, and an electronic control unit, the diagnostic method comprising:
pressurizing intake air flowing through an intake passage of the internal combustion engine with the supercharger;
transferring the intake air to the combustion chamber of the internal combustion engine with the supercharger;
reducing a supercharging pressure with the supercharging pressure reduction mechanism, the supercharging pressure being a pressure of the intake air that is transferred to the combustion chamber by the supercharger;
obtaining, by the electronic control unit, an integrated value of an intake air amount during a predetermined period, the predetermined period being a period from a start of an increase in the supercharging pressure to an end of the increase at the time when the intake air amount is increased in a state where no command to reduce the supercharging pressure by the supercharging pressure reduction mechanism is issued; and
determining, by the electronic control unit, whether the supercharging system has an abnormality on the basis of a correlation between a peak supercharging pressure during the predetermined period and the integrated value of the intake air amount, the peak supercharging pressure being an amount of increase in the supercharging pressure.

8. The diagnostic method according to claim 7, wherein the electronic control unit is configured to, when the integrated value of the intake air amount deviates to a positive side with respect to a value during normal times, which is estimated from the peak supercharging pressure, determine that the supercharging system has an abnormality.

9. The diagnostic method according to claim 7, wherein the electronic control unit is configured to, when the peak supercharging pressure deviates to a negative side with respect to a value during normal times, which is estimated from the integrated value of the intake air amount, determine that the supercharging system has an abnormality.

10. The diagnostic method according to claim 7, wherein an integrated value of an amount of increase in the intake air amount from the start of an increase in the supercharging pressure is used as the integrated value of the intake air amount, which is used to determine whether the supercharging system has an abnormality.

11. The diagnostic method according to claim 7, wherein the supercharger is a turbocharger that supercharges the internal combustion engine by driving a compressor with the use of a turbine, the turbine is installed in an exhaust passage of the internal combustion engine and is operated by stream of exhaust gas flowing through the exhaust passage, the compressor is installed in the intake passage of the internal combustion engine,
the supercharging pressure reduction mechanism is a waste gate valve installed in a bypass passage, the bypass passage is a passage that bypasses the turbine and allows the exhaust gas to flow, and
the waste gate valve is configured to
   interrupt passage of the exhaust gas flowing through the bypass passage when the waste gate valve is fully closed, and
   allow passage of the exhaust gas flowing through the bypass passage when the waste gate valve is open.

12. The diagnostic method according to claim 7, wherein the supercharger is a mechanical supercharger that supercharges the internal combustion engine by driving a compressor by using power of the internal combustion engine, the compressor is installed in the intake passage of the internal combustion engine,
the supercharging pressure reduction mechanism is a relief valve, the relief valve is provided at a portion downstream of the compressor in the intake passage of the internal combustion engine, and
the relief valve is configured to
   emit part of intake air flowing through the portion to an outside when the relief valve is open, and
   interrupt the emission of part of the intake air flowing through the portion to the outside when the relief valve is fully closed.

13. A supercharging system comprising:
an internal combustion engine;
a supercharger configured to supercharge the internal combustion engine;
a valve configured to reduce a supercharging pressure;
a first sensor configured to detect an intake air amount of the internal combustion engine;
a second sensor configured to detect the supercharging pressure; and
an electronic control unit configured to
   compute an integrated value of the intake air amount during a predetermined period on the basis of a detected result of the first sensor, the predetermined period being a period from a start of an increase in the supercharging pressure to an end of the increase at the time when the intake air amount is increased in a state where no command to reduce the supercharging pressure by the valve is issued,
   acquire a peak supercharging pressure from a detected result of the second sensor, the peak supercharging pressure being an amount of increase in the supercharging pressure during the predetermined period, and
   determine whether the supercharging system has an abnormality on the basis of the integrated value of the intake air amount and the peak supercharging pressure.

14. The supercharging system according to claim 13, wherein
the electronic control unit is configured to
   set a determination value, the determination value at the time when the peak supercharging pressure is a first pressure being larger than the determination value at the time when the peak supercharging pressure is a second pressure, wherein the first pressure is higher than the second pressure, and
   when the integrated value of the intake air amount is larger than the determination value, determine that the supercharging system has an abnormality.

15. The supercharging system according to claim 13, wherein
the electronic control unit is configured to
   set a determination value, the determination value at the time when the integrated value of the intake air amount is a first integrated value being larger than the determination value at the time when the integrated value is a second integrated value, wherein the first integrated value is larger than the second integrated value, and
   when the peak supercharging pressure is lower than the determination value, determine that the supercharging system has an abnormality.

16. The supercharging system according to claim 13, wherein
the electronic control unit is configured to compute the integrated value of the intake air amount as a value through integration of a value, obtained by subtracting a second intake air amount from a first intake air amount, during the predetermined period, the first intake air amount being the intake air amount detected at the start of an increase in the supercharging pressure, the second intake air amount being the intake air amount detected currently.

17. The supercharging system according to claim 13, wherein
the supercharger is a turbocharger that supercharges the internal combustion engine by driving a compressor with the use of a turbine, the turbine is installed in an exhaust passage of the internal combustion engine and is operated by stream of exhaust gas flowing through the exhaust passage, the compressor is installed in an intake passage of the internal combustion engine,
the valve is a waste gate valve installed in a bypass passage, the bypass passage is a passage that bypasses the turbine and allows the exhaust gas to flow, and
the waste gate valve is configured to
   interrupt passage of the exhaust gas flowing through the bypass passage when the waste gate valve is fully closed, and allow passage of the exhaust gas flowing through the bypass passage when the waste gate valve is open.

18. The supercharging system according to claim 13, wherein the supercharger is a mechanical supercharger that supercharges the internal combustion engine by driving a compressor by using power of the internal combustion engine, the compressor is installed in an intake passage of the internal combustion engine, the valve is a relief valve, the relief valve is provided at a portion downstream of the compressor in the intake passage of the internal combustion engine, and the relief valve is configured to emit part of intake air flowing through the portion to an outside when the relief valve is open, and interrupt the emission of part of the intake air flowing through the portion when the relief valve is fully closed.

* * * * *